July 16, 1968   J. D. OBERTELLI ET AL   3,393,128
NUCLEAR REACTOR FUEL ELEMENT ASSEMBLIES Filed Aug. 8, 1966   3 Sheets-Sheet 1

United States Patent Office 3,393,128
Patented July 16, 1968

3,393,128
NUCLEAR REACTOR FUEL ELEMENT
ASSEMBLIES
John David Obertelli, Poole, Dorset, Ronald Hugh Campbell, Bowden, John Arthur Godfrey Holmes, Cuddington, Northwich, and Alan Charles Anthony Saunders, Ribbleton, Preston, England, assignors to United Kingdom Atomic Energy Authority, London, England
Filed Aug. 8, 1966, Ser. No. 570,790
Claims priority, application Great Britain, Aug. 23, 1965, 36,176/65
6 Claims. (Cl. 176—78)

ABSTRACT OF THE DISCLOSURE

A nuclear reactor fuel element assembly for use in water/steam coolant. A cluster of fuel rod elements are provided with cellular bracing grids which have deflectors for extracting water entrained in steam flow and directing it on to the fuel rods.

---

This invention relates to nuclear reactor fuel element assemblies of the kind comprising a cluster of end supported, spaced fuel elements and transverse bracing grids for the fuel elements, hereinafter referred to as fuel element assemblies of the kind described.

Fuel element assemblies of the kind described are used in nuclear reactor cores of the kind comprising a bulk of moderating material penetrated by tubular members containing the fuel element assemblies and conducting coolant flow in liquid phase in heat exchange with the fuel element assemblies to generate coolant in the vapour phase by boiling. An example of this kind of nuclear reactor core is the steam generating, heavy water moderated reactor described in Nuclear Engineering of February 1964. The transverse bracing grids commonly used in fuel element assemblies of the kind described comprise thin wall members arranged edge on to coolant flow through the fuel element assembly and defining a group of ferrules enclosed within a peripheral rim. The ferrules encircle the fuel elements and in such a nuclear reactor core coolant is arranged to flow longitudinally of the tubular members through and about the fuel element assembly. The heat transfer efficiency of vapour phase coolant is low relative to that of liquid phase coolant however, and in order to optimise heat transfer from the fuel elements it is desirable to maintain at least a film of liquid phase coolant on the fuel element surfaces.

According to the invention, for a nuclear reactor wherein steam is generated from water boiled by heat exchange with nuclear fuel elements, there is provided a nuclear fuel element assembly comprising a cluster of spaced fuel elements with transverse bracing grids, at least one of said grids having coolant flow deflecting vanes disposed and shaped for extracting liquid phase coolant entrained in vapour phase coolant and directing it into contact with selected regions of fuel element surfaces.

A transverse bracing grid for a nuclear reactor fuel element assembly according to the invention may comprise a group of ferrules contained within a peripheral rim, each ferrule for encircling a fuel element, said grid having coolant flow deflecting vanes disposed and shaped for extracting liquid phase coolant entrained in vapour phase coolant and directing it into contact with selected regions of fuel element surfaces.

The invention also resides in a nuclear reactor having a moderator penetrated by tubes for conducting coolant water and containing nuclear fuel assemblies, each comprising a cluster of spaced fuel elements with transverse bracing grids, at least one of said grids having coolant flow deflecting vanes disposed and shaped for extracting liquid phase coolant entrained in vapour phase coolant and directing it into contact with selected regions of fuel element surfaces.

Embodiments of the invention will now be described, by way of example, with reference to the accompanying drawings wherein.

Figure 1:
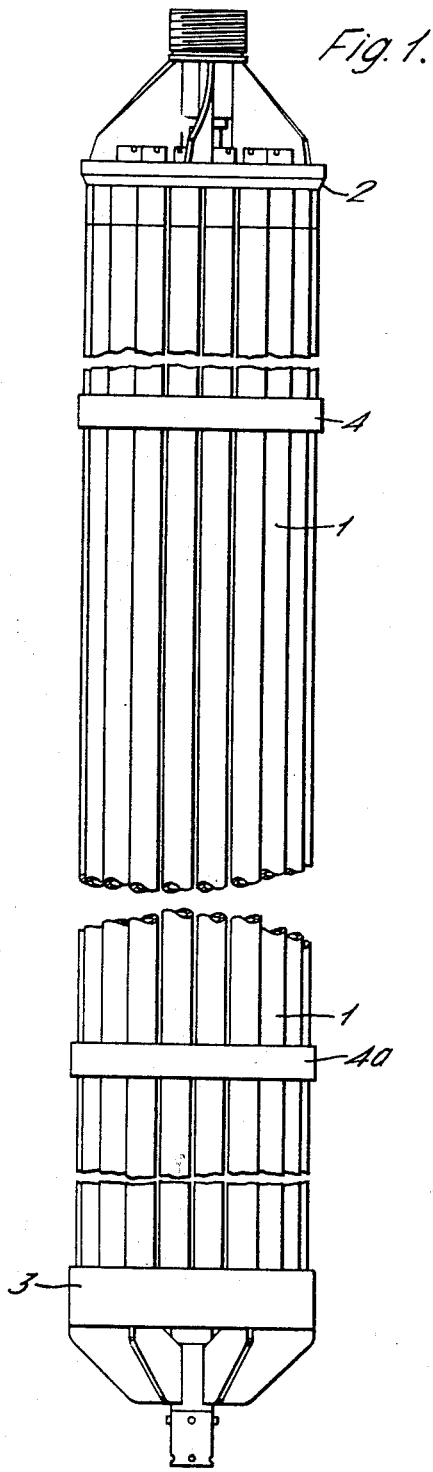
FIGURE 1 is a fragmentary side view of a nuclear reactor fuel element assembly.
Figure 2:
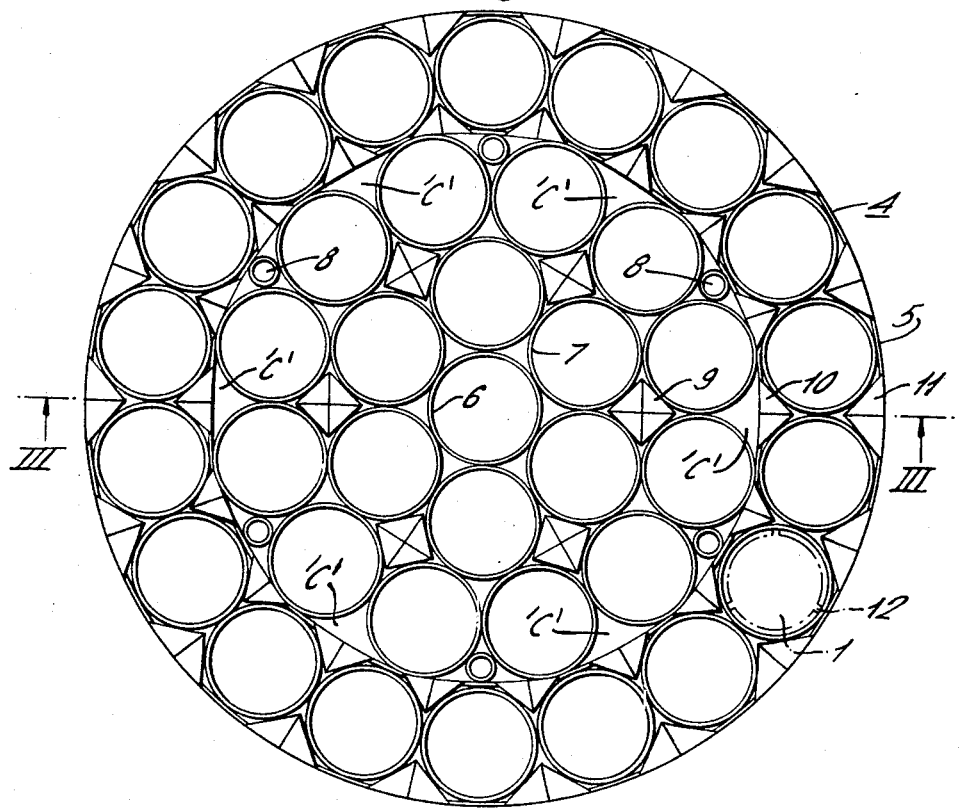
FIGURE 2 is a plan view of a first transverse bracing grid for the nuclear reactor fuel element assembly of FIGURE 1.
Figure 3:
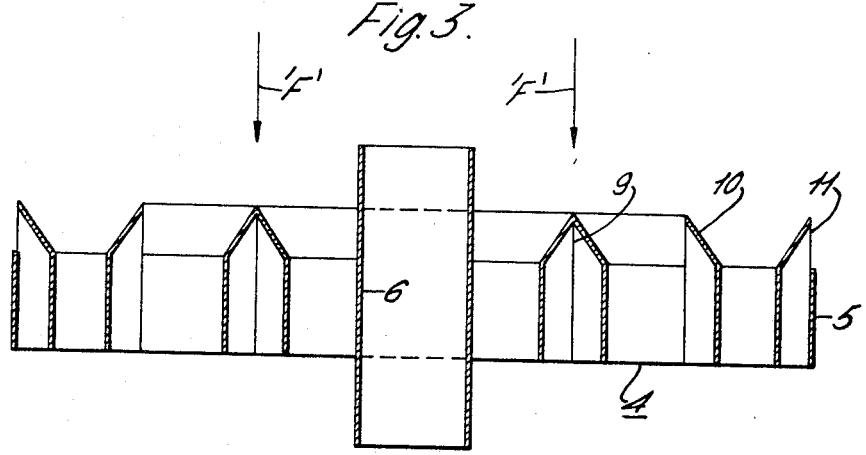
FIGURE 3 is a cross-sectional side view on line III—III of FIGURE 2.

The nuclear reactor fuel element assembly shown in FIGURE 1 comprises thirty-six closely spaced fuel elements 1 arranged on three concentric pitch circles about a central tube. The fuel elements are end supported by a plate 2 and a grid 3, the fuel elements being secured to the plate 2 as by welding, which thereby controls the cluster geometry. The fuel elements are slidably guided by the grid 3 to compensate for linear thermal expansion. Transverse bracing grids 4, 4a are secured by welding to the central tube at intervals between the plate 2 and grid 3. One transverse bracing grid 4 is shown in more detail in FIGURES 2 and 3 and comprises a peripheral rim 5 and a central ring 6 of thin stainless steel strip material defining an annulus which contains a group of ferrules 7. The ferrules 7 are arranged on three concentric pitch circles to correspond with the disposition of the fuel elements, each ferrule 7 serving to encircle and position a fuel element 1. The fuel elements 1 pass through the ferrules 7 with an annular clearance but have bearing pads 12 for guiding the elements in the ferrules as shown in broken line in FIGURE 2. The ferrules 6, 7 and the rim 5 are welded together where they abut and the smaller tubular members designated 8 are welded into interspaces where adjacent ferrules fail to abut so as to achieve a rigid construction. The transverse bracing grid 4 is characterised by coolant flow deflecting vanes 10, 11 disposed and shaped for extracting liquid phase coolant entrained in vapour phase coolant and directing it into contact with selected regions of fuel element surfaces. The transverse bracing grids 4a are similar to grids 4 except that they do not have the characterising deflecting vanes. The grid 4 has deflecting vanes 9 forming a first group whilst the vanes 10, 11 form a second group. The vanes 9, 10, 11 of the grid 4 are made of thin stainless steel and are welded to the ferrules 7. Relative to FIGURE 2, the deflectors extend outwardly from the face of the grid the extensions being of divergent form, for example, pyramidal as of deflectors 9 (FIGURE 3) so as to present a "prow" like profile to coolant flowing towards them in the direction indicated by the arrows designated F. The transverse bracing grid 4 shown in FIGURE 2 is assembled in the fuel element assembly of FIGURE 1 such that the deflectors extend towards the grid 3.

Figure 4:
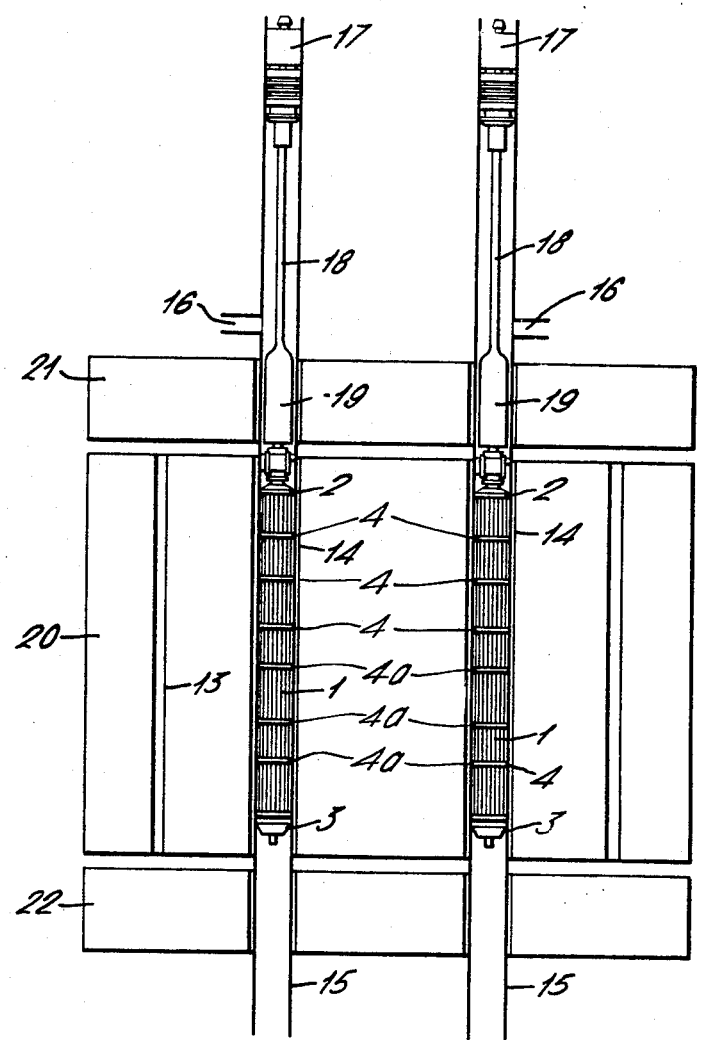
FIGURE 4 is a diagrammatic side view of a nuclear reactor core.

The fuel element assembly is used in a steam generating, heavy water moderated nuclear reactor core which is shown diagrammatically in FIGURE 4. The moderator is contained within a tank 13 which is penetrated by open ended tubes 14, two only of which are shown. Tubular members, hereinafter referred to as pressure tubes 15, extend through the core via the open ended tubes 14 and house fuel element assemblies. The pressure tubes 15 have branch pipes 16. The fuel element assemblies are each suspended from a closure plug 17 for the pressure tube by a tie member 18 which includes a neutron shield plug 19. The tank is bounded by neutron shield tanks 20, 21, 22 containing light water.

The lower ends of the pressure tubes 15 define inlets for light water serving as coolant which flows upwardly along the fuel elements 1 to generate steam by heat exchange with the fuel elements. The steam fraction of the resulting steam/water mixture increases progressively along the pressure tubes in the directon of coolant flow. The coolant passes through the transverse bracing grids 4, 4a via the interspaces bounded by adjacent ferrules 7 and through the annular clearances bounded by the fuel elements and ferrules. The upper ends of the pressure tubes define outlets for coolant flow and a mixture of steam and water passes from the pressure tubes via branch pipes 16 to a steam drum (not shown) where separation of steam from water takes place.

In operation, the water in surface contact with the fuel elements is boiled to generate steam which streams along the fuel assembly carrying entrained water. Some surface regions of the fuel elements in the vicinity of the bracing grids are susceptible to complete or partial loss of liquid cooling with resultant overheating termed "burn-out." The first group of deflecting vanes 9 being directed towards coolant flow inlets to the tubes serve to direct coolant flow towards the radially outer fuel elements of the cluster where neutron flux density is greater, heater generation is higher and rate of flow of coolant can be lower and, the second group of deflecting vanes 10, 11 serve to extract the liquid phase coolant entrained in vapour phase coolant as it approaches the grid interspaces and direct it to selected regions of the fuel rods which are most susceptible to "burn-out." The grids 4 are disposed in the upper part of the core where the steam fraction of the coolant is greatest, that is, they are disposed within the core region which is to one side of a central plane transverse to the pressure tubes and which includes the coolant outlet ends of the tubes. The grids 4a without deflector vanes are disposed in the region of the core where the steam fraction is small, susceptibility of "burn-out" of the elements is low and therefore provides that restriction to coolant flow through the pressure tubes is less than would otherwise be the case if all the grids had deflector vanes.

Figure 5:
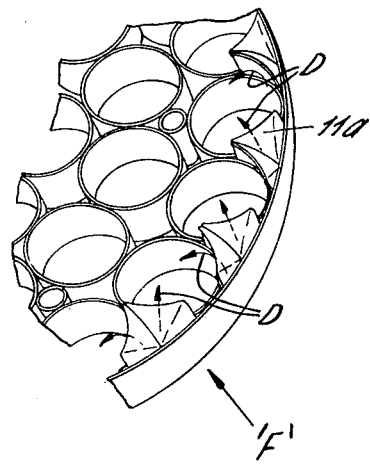
FIGURE 5 is a fragmentary perspective view of a second transverse bracing grid.

In an alternative construction of transverse bracing grid shown in FIGURE 5 deflectors 11a are attached to the grid to project from the face which is directed towards the coolant flow outlet ends of the pressure tubes, that is, with reference to FIGURE 4, on the upper faces of the grid. The deflectors 11a occupy the same radial positions as the deflectors 11 of FIGURE 2 but are profiled to "scoop" coolant after it has passed through the interspaces of the grid in the direction indicated by the arrow F shown in FIGURE 5 and to direct it on to the fuel rod regions immediately above the ferrules 7 as indicated by the arrows D.

In a third construction (not shown) of transverse bracing grid for a fuel element assembly "prow" like deflectors 11 are disposed on the face which is to be the lower face when installed in the reactor core shown in FIGURE 4 and "scoop" like deflectors are disposed on the reverse side in the same radial positions as the deflectors 10 of FIGURE 2.

In a fourth construction of transverse bracing grid turbulence of coolant flow through some of the interspaces bounded by ferrules of the two outer annuli of ferrules is increased by deflecting vanes which are of a different form to any of the aforementioned "prow" and "scoop" like deflectors. The alternative deflectors are located in the cusped four sided interspaces (designated C in FIGURE 2) bounded by the intermediate and outer annuli of ferrules 7. The vanes are of cruciform section and are twisted about the axis which is parallel to coolant flow to impart swirl to coolant flowing through the interspaces containing the vanes. The vanes serve to extract liquid phase coolant and the resultant generally helical path of steam leaving the interspaces causes the extracted liquid phase coolant to impinge on the adjacent fuel rods generally in the selected regions which are susceptible to "burn-out."

We claim:
1. A nuclear reactor fuel element assembly for a reactor wherein steam is generated from water boiled by heat exchange with fuel elements, said assembly comprising a cluster of spaced fuel elements with transverse bracing grids, each of said grids having a group of cell defining ferrules and each fuel element of the cluster being slidably guided by a ferrule of each grid, each grid having a group of interstitial cells formed interstitially of said ferrules for conducting coolant flow through said grids, said interstitial cells being of smaller area than said ferrule defined cells, at least one of said grids having structure defining flow deflection vanes, said structure free-standing from at least one face side of the grid between and spaced from said fuel elements, each vane presenting an oblique surface to coolant flow through its associated interstitial cell.

2. A nuclear reactor having a moderator penetrated by tubes for conducting coolant water and containing nuclear fuel element assemblies according to claim 1.

3. A nuclear reactor according to claim 2, wherein the deflecting vanes are attached to said one of said grids to project from a face thereof which is directed towards an end of a tube defining an inlet for coolant flow into the tube.

4. A nuclear reactor according to claim 2, wherein the deflecting vanes are attached to said one of said grids to project from a face thereof which is directed towards an end of a tube defining an outlet for coolant flow from the tube.

5. A nuclear reactor according to claim 2, wherein the deflecting vanes are attached to said one of said grids to project from both its faces.

6. A nuclear reactor according to claim 2, wherein grids having deflector vanes are disposed within the core in a region which is to one side of a central plane of the core, which plane is transverse to the tubes, said core region including the outlet defining ends of the tubes for coolant flow.

References Cited

UNITED STATES PATENTS

| | | | |
|---|---|---|---|
| 3,070,537 | 12/1962 | Treshow | 176—61 X |
| 3,185,632 | 5/1965 | Bradley | 176—78 X |
| 3,205,147 | 9/1965 | Foote et al. | 176—64 X |
| 3,228,854 | 1/1966 | Bekkering et al. | 176—78 |
| 3,255,091 | 6/1966 | Frisch | 176—78 |
| 3,308,031 | 3/1967 | Pon | 176—78 X |
| 3,344,855 | 10/1967 | Clark | 176—78 X |

FOREIGN PATENTS 973,137  10/1964  Great Britain.

CARL D. QUARFORTH, *Primary Examiner.*

BENJAMIN R. PADGETT, *Examiner.*

M. J. SCOLNICK, *Assistant Examiner.*